US009908519B2

(12) United States Patent
Foitzik et al.

(10) Patent No.: US 9,908,519 B2
(45) Date of Patent: Mar. 6, 2018

(54) BRAKING SYSTEM FOR A VEHICLE AND METHOD FOR OPERATING THE BRAKING SYSTEM

(71) Applicant: Robert Bosch GmbH, Stuttgart (DE)

(72) Inventors: Bertram Foitzik, Ilsfeld (DE); Otmar Bussmann, Abstatt (DE); Matthias Kistner, Bretzfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/244,625

(22) Filed: Apr. 3, 2014

(65) Prior Publication Data
US 2014/0306514 A1 Oct. 16, 2014

(30) Foreign Application Priority Data

Apr. 10, 2013 (DE) .......................... 10 2013 206 324

(51) Int. Cl.
| B60T 13/68 | (2006.01) |
| B60T 13/14 | (2006.01) |
| B60T 7/04 | (2006.01) |
| B60T 13/66 | (2006.01) |
| B60T 8/36 | (2006.01) |

(Continued)

(52) U.S. Cl.
CPC ............ *B60T 13/686* (2013.01); *B60T 7/042* (2013.01); *B60T 8/3655* (2013.01); *B60T 8/4072* (2013.01); *B60T 8/4872* (2013.01); *B60T 13/142* (2013.01); *B60T 13/146* (2013.01); *B60T 13/662* (2013.01)

(58) Field of Classification Search
CPC ...... B60T 13/16; B60T 13/686; B60T 13/142; B60T 8/3655; B60T 8/4072; B60T 8/4872
USPC .......................................... 303/3, 116.3, 152
See application file for complete search history.

(56) References Cited

U.S. PATENT DOCUMENTS 9,221,441 B2 * 12/2015 Strengert .................. B60T 1/10
2004/0239177 A1 * 12/2004 Kusano ..................... B60T 7/12
303/119.1

(Continued)

FOREIGN PATENT DOCUMENTS

CN 1478027 A 2/2004
CN 101909957 A 12/2010

(Continued)

*Primary Examiner* — Xuan Lan Nguyen
(74) *Attorney, Agent, or Firm* — Norton Rose Fulbright US LLP; Gerard Messina

(57) ABSTRACT

A braking system for a vehicle includes: a brake input element for an actuation to input a brake pressure signal by a driver; a brake master cylinder coupled to the brake input element and supplied with hydraulic fluid from a hydraulic fluid reservoir fluidically connected to the brake master cylinder; and a first brake circuit. The first brake circuit has: a switchover valve with controllable through flow rate for the hydraulic fluid; a pressure regulating valve with controllable through flow rate for the hydraulic fluid; a hydraulic pump for optionally building up an elevated hydraulic fluid pressure in the first brake circuit; at least one first wheel brake cylinder exerting a braking torque on a first vehicle wheel coupled to the wheel brake cylinder; and a first fluid line from the hydraulic fluid reservoir being fluidically connected to the pressure regulating valve and to the hydraulic pump.

7 Claims, 1 Drawing Sheet

(51) Int. Cl.
 *B60T 8/40* (2006.01)
 *B60T 8/48* (2006.01)

(56) References Cited

U.S. PATENT DOCUMENTS

| | | | |
|---|---|---|---|
| 2005/0200199 A1* | 9/2005 | Kamiya et al. | ............... 303/191 |
| 2012/0126610 A1* | 5/2012 | Nakata et al. | ............... 303/9.63 |
| 2013/0057052 A1* | 3/2013 | Kunz et al. | ....................... 303/3 |
| 2013/0292999 A1* | 11/2013 | Strengert et al. | ............... 303/10 |

FOREIGN PATENT DOCUMENTS

| | | | | |
|---|---|---|---|---|
| DE | 10 2009 001 401 | | 9/2010 | |
| DE | 102010062354 A1 | * | 6/2012 | ................ B60T 1/10 |
| WO | 2012156125 A1 | | 11/2012 | |
| WO | 2013017314 A2 | | 2/2013 | |

\* cited by examiner

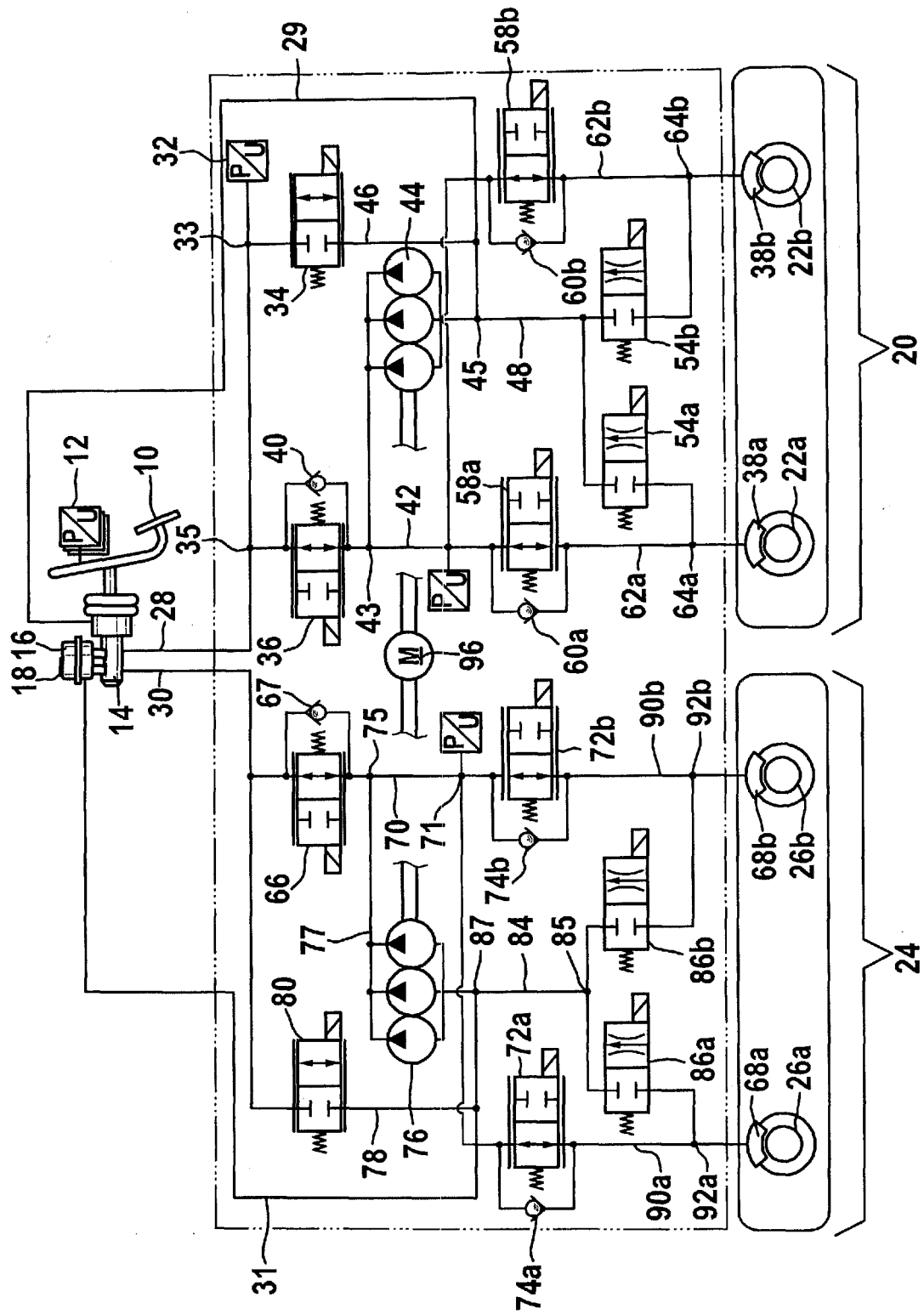

BRAKING SYSTEM FOR A VEHICLE AND METHOD FOR OPERATING THE BRAKING SYSTEM

BACKGROUND OF THE INVENTION

1. Field of the Invention

The present invention relates to a braking system for a vehicle and a method for operating this braking system, in particular for use in hybrid and/or electric vehicles.

2. Description of the Related Art

A brake input element situated in a vehicle, for example a brake pedal, is conventionally coupled to a brake booster. The brake booster is designed for the purpose, for example, of boosting a brake force exerted by a driver on the brake input element and subsequently relaying the boosted brake force to a brake master cylinder. The brake master cylinder thereupon outputs a boosted pressure signal to the wheel brake cylinders for braking wheels of the vehicle. The brake booster therefore allows the driver to decelerate the vehicle with less force application by operating the brake input element.

An example of a brake booster for boosting a brake force exerted by the driver on the brake input element is a vacuum brake booster or also an electrohydraulic brake booster.

However, the manufacturing costs for a braking system having a brake booster, of whatever type, are comparatively high. In a system having a vacuum brake booster, this is true in particular if a vacuum pump is necessary to produce the vacuum, and the vacuum is not supplied by the internal combustion engine.

It is therefore desirable to have an option for braking a vehicle via an actuation of a brake input element with comparatively little force without a use of a brake booster and nonetheless to provide the driver with a "familiar" brake pedal feeling, i.e., without having to apply a relatively high force to decelerate the vehicle.

A braking system is disclosed in the published German patent application document DE 10 2009 001 401 A1, which does not use a brake booster, but nonetheless has a relatively large number of components, which are linked to additional costs, on the one hand, and require corresponding installation space (packaging), on the other hand.

BRIEF SUMMARY OF THE INVENTION

The present invention provides a braking system for a vehicle, the braking system including: a brake input element, which is designed for an actuation to input a brake pressure signal by a driver of the vehicle; a brake master cylinder, which is coupled to the brake input element, and which may be supplied with hydraulic fluid from a hydraulic fluid reservoir fluidically connected to the brake master cylinder; a first brake circuit, including: a switchover valve, whose through flow rate for the hydraulic fluid is controllable; a pressure regulating valve, whose through flow rate for the hydraulic fluid is controllable; a hydraulic pump for optionally building up an elevated hydraulic fluid pressure in the first brake circuit; at least one first wheel brake cylinder, which is designed for the purpose of exerting a braking torque on a first vehicle wheel coupled to the wheel brake cylinder; a first fluid line, originating from the hydraulic fluid reservoir, being fluidically connected both directly to the pressure regulating valve and to the hydraulic pump, a braking torque on the at least one first wheel brake cylinder using hydraulic fluid being able to be generated essentially by the hydraulic pump, and the pressure regulating valve and the switchover valve being controllable according to predefinable characteristic values, upon which an appropriate pedal feeling may be provided to the driver in response to the activation of the valves.

The present invention provides a method for operating a braking system for a vehicle, the braking system including: a brake input element, which is designed for an actuation to input a brake pressure and/or pedal travel signal by a driver of the vehicle, a brake master cylinder, which is coupled to the brake input element in such a way that an input brake pressure and/or pedal travel signal may be provided unboosted to the brake master cylinder, the brake master cylinder being designed to output a pressure signal corresponding to the brake pressure and/or pedal travel signal, a brake circuit having a switchover valve, which is switchable into at least one open operating mode and one closed operating mode, and at least one wheel brake cylinder situated on a vehicle wheel, which is designed for the purpose of exerting a braking torque, which corresponds to a provided pressure signal, on the vehicle wheel, and which is coupled via the switchover valve to the brake master cylinder in such a way that the unboosted pressure signal output from the brake master cylinder may be relayed via the switchover valve, which is switched into the at least one open operating mode, to the wheel brake cylinder, and a relay of the unboosted pressure signal to the wheel brake cylinder is controllable by the switchover valve switched into the closed operating mode, and a hydraulic pump which is designed for the purpose of outputting a boosting pressure signal and which is coupled to the wheel brake cylinder in such a way that the boosting pressure signal may be relayed to the wheel brake cylinder, the method including the following steps: exerting an unboosted braking torque on the at least one vehicle wheel by controlling the switchover valve in the open operating mode, so that the unboosted pressure signal is relayed to the wheel brake cylinder; or exerting a boosted braking torque on the at least one vehicle wheel by controlling the switchover valve in a partially open operating mode, and the pressure regulating valve and the switchover valve being controllable according to predefinable characteristic values, upon which the driver may be provided with an appropriate pedal feeling in response to the activation of the valves.

The advantage of the braking system according to the present invention is that it has relatively few components, and is therefore manufacturable cost-effectively and also—as a result of the relatively few components—is less susceptible to malfunctions, but nonetheless offers a fallback level, and requires relatively little installation space. Due to the arrangement and function of the valves in the brake circuits, a desired pedal feeling which is perceptible by the driver may be achieved.

The braking system preferably has a second brake circuit, which is constructed similarly to the first brake circuit, a second fluid line being fluidically coupled to the hydraulic fluid reservoir, on the one hand, and directly to a pressure regulating valve and a hydraulic pump of the second brake circuit in each case, on the other hand, a braking torque for at least one second wheel brake cylinder, which is associated with the second brake circuit, being able to be generated. Vehicles are generally preferably equipped with two brake circuits, which ensures increased driving safety and driving performance.

In addition, it is preferable for the first brake circuit and the second brake circuit to each include at least two vehicle wheels, which are each associated with one vehicle axle of the vehicle or also with different vehicle axles of the vehicle, the vehicle wheels each being coupled to a wheel brake cylinder. This is also advantageous for increased driving safety and driving performance.

In addition, it is preferable that, with respect to the first and/or second brake circuit, the pressure regulating valve may be completely opened and the switchover valve may be opened in accordance with a differential pressure signal or a predefinable characteristic value and the hydraulic pump generates a fluid pressure in the hydraulic fluid, upon which a braking torque for the vehicle wheels is provided at the wheel brake cylinders. An additional brake booster may therefore be omitted, and it is possible to provide the driver with a pedal feeling corresponding to the jump-in behavior of the vacuum brake booster in response to the activation of the valves, without having to use a corresponding simulator.

Finally, it is preferable for the brake input element to be coupled to a sensor, which detects an actuation of the brake input element by the driver with respect to the intensity of the actuation and the duration of the actuation of the brake input element, whereby the valves or hydraulic pumps may be activated accordingly.

BRIEF DESCRIPTION OF THE DRAWINGS

FIG. 1 shows a schematic hydraulic circuit diagram, on the basis of which the braking system per se and its functionality according to one specific embodiment of the present invention are explained.

DETAILED DESCRIPTION OF THE INVENTION

FIG. 1 shows a simplified and schematic view of a hydraulic circuit diagram according to one specific embodiment of the present invention.

The braking system shown in FIG. 1 includes a brake input element 10, which is designed for an actuation by a driver to decelerate the vehicle using the braking system. Brake input element 10 is a brake pedal, for example. However, it is to be noted here that the braking system is not restricted to a brake input element 10 designed as a brake pedal. Instead, a braking intent of the driver may also be detectable by a brake input element 10 designed differently.

A brake pressure and/or pedal travel sensor 12, which is designed as redundant, is situated on brake input element 10. Brake pressure and/or pedal travel sensor 12 is designed for the purpose, for example, of detecting a pressure exerted by the driver on brake input element 10. Alternatively or additionally thereto, brake pressure and/or pedal travel sensor 12 may also be designed for the purpose of ascertaining a pedal travel, by which brake input element 10 is displaced by an actuation of the driver.

Brake input element 10 is coupled to a brake master cylinder 14 in such a way that a brake pressure and/or pedal travel signal, which corresponds to the actuation of brake input element 10 by the driver, is relayed unboosted to brake master cylinder 14. The brake pressure and/or pedal travel signal corresponds, for example, to a pressure exerted on brake input element 10. The brake pressure and/or pedal travel signal may also correspond to a pedal travel, by which brake input element 10 is displaced by the driver. To provide the brake pressure and/or pedal travel signal, brake input element 10 is coupled, for example, via a sensor unit or via a coupling element to brake master cylinder 14. Since suitable sensor units and usable coupling elements are known from the related art, they will not be discussed in greater detail here.

It is expressly noted here that in the braking system shown in FIG. 1, a brake booster, for example, an electrically operated booster or a vacuum booster, which is conventionally situated between a brake input element 10 and a brake master cylinder 14, is not necessary. A use of the illustrated braking system in a vehicle is therefore linked to the advantage that the costs, the required installation space, and the additional weight for a brake booster are omitted. The illustrated braking system is therefore advantageous in particular for electric vehicles, which do not have an internal combustion engine.

The essential point of the present invention is that in a relatively simple way and using relatively few components (the braking system does not require, for example, a pressure accumulator or a brake booster coupled to the brake master cylinder or a pedal simulator unit, the use of which causes additional costs, a braking system is provided, which provides a desired brake pedal characteristic (i.e., by way of predefinable characteristic curves) to the driver, solely by appropriate activation of valves and hydraulic pumps explained hereafter. The provided braking system is therefore relatively cost-effective and is usable for a variety of vehicle models.

Therefore, in the braking system described here, brake master cylinder 14 is designed for the purpose of outputting an unboosted pressure signal for a brake pressure and/or pedal travel signal. Brake master cylinder 14 is connected to a brake medium reservoir 16, which is fillable via a filling piece 18. For example, brake medium reservoir 16 is a hydraulic fluid and/or brake fluid tank.

The braking system shown in FIG. 1 includes two identically constructed brake circuits 20, 24, brake circuit 20 being associated with a front axle of the vehicle to decelerate vehicle wheels 22a, 22b, and brake circuit 24 being associated with a rear axle of the vehicle to decelerate vehicle wheels 26a, 26b.

The specific embodiment shown is not restricted to this allocation of wheels 22a, 22b, 26a, and 26b, however. Of course, the braking system is also applicable to a specific embodiment in which wheels 22a and 22b are rear wheels and wheels 26a and 26b are front wheels of the vehicle. Wheels 22a and 22b and wheels 26a and 26b may also be two pairs of wheels, which are situated on two different sides of the vehicle or diagonally on a vehicle.

In addition, it is to be noted that the braking system shown in FIG. 1 is not restricted to a number of four wheels 22a, 22b, 26a, and 26b. Instead, the braking system may also be expanded in such a way that it controls a greater number of wheels.

In the specific embodiment shown of the braking system, it is conceivable to design the motor or motors of the vehicle, which are electrically operated, for example, in such a way that the acceleration torque acts on front wheels 22a and 22b. Of course, the braking system is also usable in a vehicle having a rear wheel drive or an all-wheel drive, as is familiar to those skilled in the art.

A first fluid line 28 leads from brake master cylinder 14 to first brake circuit 20. A second fluid line 30 connects brake master cylinder 14 to second brake circuit 24. A pressure sensor 32, the advantageous functionality of which will be described in greater detail hereafter, may be connected to first fluid line 28.

In addition, a controllable pressure regulating valve 34 is connected via a branching point 33 and a switchover valve 36 is connected via a branching point 35 to first fluid line 28. A hydraulic fluid stream originating from brake master cylinder 14 may flow as an unboosted pressure signal in first brake circuit 20 optionally via controllable pressure regulating valve 34 and at least one pump 44 or via switchover valve 36 may flow in the direction toward wheel brake cylinders 38a and 38b of wheels 22a and 22b.

A bypass line having a check valve 40 is situated in parallel to switchover valve 36. In the event of a malfunction of switchover valve 36, the hydraulic connection between brake master cylinder 14 and wheel brake cylinders 38a and 38b, which would otherwise be interrupted as a result of the malfunction of switchover valve 36, is ensured by the bypass line having check valve 40.

A line 42 is connected to switchover valve 36, this line having a branching point 43, which leads to a delivery side of the at least one pump 44 of first brake circuit 20. The at least one pump 44 is preferably a single-piston pump or a similarly designed displacement element. However, the at least one pump 44 may also be a pump having multiple pistons or a gear type pump. Instead of only one pump 44, multiple pumps 44 (there are three in the example shown in FIG. 1) may also be used in first brake circuit 20. The specific embodiment described here is not restricted to a specific number of pumps 44.

A fluid line 46, which leads away from pressure regulating valve 34, is connected via a branching point 45 to a fluid line 48, which leads from the suction side of the at least one pump 44 to wheel outlet valves 54a, 54b, wheel outlet valves 54a, 54b respectively being associated with wheel brake cylinders 38a, 38b. Wheel brake cylinders 38a, 38b are connected to fluid line 48 via branching points 64a, 64b.

Fluid line 48 is connected via branching point 45 to a fluid line 29, which is connected directly to brake medium reservoir 16, on the one hand, and is connected via fluid line 46, which branches off of fluid line 29, to controllable pressure regulating valve 34, on the other hand. The function of fluid line 29 will be explained hereafter.

Fluid lines 62a, 62b, which originate from wheel inlet valves 58a and 58b, are respectively connected to branching points 64a, 64b. Wheel inlet valves 62a, 62b have bypass lines having check valves 60a and 60b.

Valves 34, 36, 54a, 54b, 58a, and 58b of first brake circuit 20 may be designed as hydraulic valves. Switchover valve 36 and wheel inlet valves 58a and 58b are preferably designed as valves which are open when deenergized and controllable pressure regulating valve 34 and wheel outlet valves 54a and 54b are preferably designed as valves which are closed when deenergized.

Wheel brake cylinders 38a and 38b are coupled to brake master cylinder 14 in such a way that the unboosted pressure signal output by brake master cylinder 14 may be relayed to wheel brake cylinders 38a and 38b. The two wheel brake cylinders 38a and 38b are designed for the purpose of exerting a force corresponding to the unboosted pressure signal on wheels 22a and 22b associated therewith to decelerate the vehicle.

It is therefore possible for the driver to initiate braking directly in first brake circuit 20. A pressure buildup requested by the driver in wheel brake cylinders 38a and 38b of the brake calipers is therefore reliably ensured during normal braking operation of the braking system, so to speak as a fallback level. The pressure of the brake calipers built up in wheel brake cylinders 38a and 38b may be rapidly dissipated accordingly.

A switchover valve 66 is coupled to brake master cylinder 14 via fluid line 30. Similarly to switchover valve 36 having a bypass line and check valve 40 (in first brake circuit 20), switchover valve 66 has a bypass line having a check valve 67 (in second brake circuit 24).

A line 70 extends from switchover valve 66 to a wheel inlet valve 72b, which is associated with wheel brake cylinder 68b. A wheel inlet valve 72a associated with wheel brake cylinder 68a is also coupled to line 70 via a branching point 71. Bypass lines having check valves 74a and 74b are situated in parallel to wheel inlet valves 72a and 72b.

Furthermore, a delivery side of at least one pump 76 of second brake circuit 24 is connected via a branching point 75 to fluid line 70. The at least one pump 76 may be designed similarly to pump 44 in the first brake circuit.

On a delivery side of the at least one pump 76, a fluid line 77 originating therefrom is connected to branching point 75.

A wheel outlet valve 86a, which is associated with wheel brake cylinder 68a, is connected via a fluid line 84 originating from the suction side of pump 76. In addition, a wheel outlet valve 86b, which is associated with wheel brake cylinder 68b, is connected to line 84 via a branching point 85.

A further branching point 87 connects fluid line 84 to a first end of a fluid line 31, the second end of which is directly connected to brake medium reservoir 16. The two wheel outlet valves 86a and 86b are therefore connected via fluid line 31 or 84 to brake medium reservoir 16 and the suction side of pump 76 and a controllable pressure regulating valve 80 via a fluid line 78.

Wheel inlet valves 72a and 72b are respectively connected via fluid lines 90a and 90b to wheel brake cylinder 68a or 68b associated therewith. Wheel outlet valve 86a is connected to line 90a via a branching point 92a. Correspondingly, wheel outlet valve 86b is connected via a branching point 92b to line 90b.

Valves 66, 72a, 72b, 80, 86a, and 86b may also be hydraulic valves. In a preferred specific embodiment, switchover valve 66 and wheel inlet valves 72a and 72b are valves which are open when deenergized, switchover valve 66, as explained hereafter, being controllable with respect to its through flow rate. In the case shown in FIG. 1, wheel outlet valves 86a and 86b are advantageously designed as valves which are closed when deenergized. Pumps 44 and 76 of the two brake circuits 20 and 24 are seated on a shared shaft, which is operated via a motor 96.

Controllable pressure regulating valves 34, 80 are designed for the purpose of dissipating fluid volumes via lines 46, 78 in a controlled way.

In summary, it may be stated that the two wheel brake cylinders 68a and 68b may be decoupled in a certain way from brake master cylinder 14 by closing switchover valve 66, and specifically in accordance with predefinable characteristic values for switchover valve 66 with respect to its through flow rate. A passage from brake master cylinder 14 to wheel brake cylinders 68a and 68b is only possible if switchover valve 66 is transmissive, so to speak as a fallback level. If this is desired or necessary (in the event of a component failure or a malfunction of one or multiple components), the driver may therefore initiate braking directly in brake circuit 24 via an actuation of brake actuating input element 10. In this case, an unboosted pressure signal, which corresponds to the actuation of brake input element 10 by the driver, is provided at the two wheel brake cylinders 68a and 68b. The two wheel brake cylinders 68a and 68b are designed for the purpose, after a provision of the unboosted pressure signal, of exerting a force corresponding to the unboosted pressure signal on wheels 26a and 26b associated therewith to decelerate the vehicle.

In one operating mode, preferably corresponding to an actuation of brake input element 10, a boosted brake force may be exerted on wheels 26a and 26b of brake circuit 24.

For this purpose, the through flow rate of switchover valve 66 is decreased accordingly. In this way, the relaying of the unboosted pressure signal to the two wheel brake cylinders 68a and 68b is more or less prevented. In addition, in this operating mode, pump 76 is activated or operated in such a way that a boosted pressure signal, which preferably corresponds to the brake pressure and/or pedal travel signal and a desired boosting factor, is generated and relayed to wheel brake cylinders 68a and 68b. Therefore, in this operating mode, wheel brake cylinders 68a and 68b exert a boosted force corresponding to the boosted pressure signal on wheels 26a and 26b.

It is to be noted here that the present invention is not restricted to a boosted pressure signal, which is greater than the unboosted pressure signal or corresponds to the unboosted pressure signal. Instead, the boosted pressure signal may also be smaller than the unboosted pressure signal. For example, the boosted pressure signal corresponds to the brake pressure and/or pedal travel signal and a predefined damping factor. Further examples of a boosted pressure signal smaller than the unboosted pressure signal will be apparent to those skilled in the art based on the following paragraphs.

To provide the boosted pressure signal, brake pressure and/or pedal travel sensor 12 may detect the brake pressure exerted by the driver on brake input element 10 and/or ascertain the pedal travel, by which brake input element 10 is displaced. Subsequently, the brake pressure and/or pedal travel may be provided to a control device to control switchover valve 66 and pump 76.

In a system state in which no brake input element 10 is actuated, preferably all valves 34, 36, 54a, 54b, 58a, 58b, 66, 72a, 72b, 86a, and 86b are deenergized. Therefore, the two brake circuits 20 and 24 are coupled to brake master cylinder 14 in such a way that an unboosted pressure signal may be relayed rapidly to wheel brake cylinders 38a, 38b, 68a, and 68b. With actuation of brake input element 10, pumps 44, 76 are operated to build up a corresponding hydraulic fluid pressure, valves 34, 36, 66, 80 being activated accordingly (for example, according to predefined characteristic curves).

In the event of an actuation of brake input element 10 by the driver, for example, in the event of a slight pressure on a brake pedal, a brake pressure and/or pedal travel signal is provided directly and unboosted to brake master cylinder 14. In this case, brake master cylinder 14 generates an unboosted pressure signal corresponding to the unboosted brake pressure and/or pedal travel signal, which is provided to wheel brake cylinders 38a, 38b, 68a, 68b. Therefore, the driver initiates braking directly in brake circuits 20, 24 via brake operation input element 10. Wheel brake cylinders 38a and 38b subsequently exert an unboosted partial braking torque corresponding to the unboosted pressure signal via wheels 22a and 22b associated therewith on the vehicle. The unboosted partial braking torque exerted via first brake circuit 20 may be ascertained, for example, with the aid of pressure sensor 32.

Wheel brake cylinders 38a and 38b of first brake circuit 20 and brake master cylinder 14 are preferably designed in such a way that the direct braking initiation in first brake circuit 20 is linked to an advantageous pedal feeling for the driver. For this purpose, for example, brake master cylinder 14 is designed for a relatively small diameter of the brake master cylinder piston.

In addition, upon the actuation of brake input element 10, the brake pressure and/or the pedal travel may be detected by brake pressure and/or pedal travel sensor 12. In consideration of the brake pressure and/or pedal travel detected by brake pressure and/or pedal travel sensor 12, an advantageous total braking torque may be ascertained, by which the vehicle is to be decelerated, for example, on the command of the driver. To ascertain the advantageous total braking torque, an item of information provided by a surroundings sensor (not shown) may also be considered.

In this case, a sensor and/or control unit (not shown) is designed to ascertain a difference between the provided total braking torque and the partial braking torque. A boosted pressure control signal is then established, which corresponds to the ascertained difference. Switchover valve 66 is simultaneously or subsequently closed more or less in accordance with its through flow rate.

The method described in the preceding paragraph may be referred to as by-wire application of the boosted braking torque by closing switchover valve 66/36 and operating pump 76/44. Since components 66/76 or 40/44 assume the boosting in the case of the by-wire application of the boosted braking torque, a brake booster may be omitted. Furthermore, the interconnection of first brake circuit 20 may be designed in such a way that boosting of the unboosted partial braking torque exerted on wheels 22a and 22b is omitted.

Simultaneously, the boosted braking torque may be selected to be comparatively large, so that also in the case of the by-wire application, a predefined pedal travel with comparatively little force by the driver is maintained via the actuation of brake input element 10. Via software parameters (i.e., characteristic curves), a desired brake deceleration may also be set or an occurring deceleration in the case of the by wire application may be compensated for.

It is also to be noted that assistance systems known to those skilled in the art, for example, ACC (adaptive cruise control), TCS (traction control system), ESP (electronic stability program), ABS (antilock braking system), superposition, etc., are possible using the provided braking system.

What is claimed is:

1. A braking system for a vehicle, comprising:
a brake input element configured for an actuation to input a brake pressure signal by a driver of the vehicle;
a brake master cylinder coupled to the brake input element and configured to be supplied with hydraulic fluid from a hydraulic fluid reservoir which is fluidically connected to the brake master cylinder; and
a first brake circuit including:
a switchover valve having a controllable through flow rate for the hydraulic fluid;
a pressure regulating valve having a controllable through flow rate for the hydraulic fluid;
a hydraulic pump for selectively building up an elevated hydraulic fluid pressure in the first brake circuit, the pressure regulating valve controlling a first fluid line between the brake master cylinder and a suction side of the hydraulic pump; and
at least one first wheel brake cylinder for exerting a braking torque on a first vehicle wheel coupled to the wheel brake cylinder;
wherein a second fluid line originating from the hydraulic fluid reservoir is fluidically connected directly to the pressure regulating valve via a first fluidic branching path that branches from the second fluid line, and is fluidically connected directly to the suction side of the hydraulic pump via a second fluidic branching path that branches from the second fluid line and is different than the first fluidic branching path, the pressure regulating valve being directly and fluidically connected to the second line only over the first fluidic branching path, and the suction side of the hydraulic pump being directly and fluidically connected to the second line only over the second fluidic branching path, a braking torque being able to be generated essentially by the hydraulic pump at the at least one first wheel brake cylinder using hydraulic fluid; and wherein the pressure regulating valve and the switchover valve are controllable according to predefined characteristic values to operate in a partially open operating mode, whereby a suitable pedal feel is provided to the driver in response to the activation of the pressure regulating valve and the switchover valve.

2. The braking system as recited in claim 1, further comprising:

a second brake circuit substantially corresponding to the first brake circuit;

wherein a fluid line is fluidically coupled to the hydraulic fluid reservoir, on the one hand, and in each case directly to a pressure regulating valve and a hydraulic pump of the second brake circuit, on the other hand, a braking torque being able to be generated for at least one second wheel brake cylinder associated with the second brake circuit.

3. The braking system as recited in claim 2, wherein the first brake circuit and the second brake circuit each include at least two vehicle wheels which are each assigned to one vehicle axle of the vehicle, the at least two vehicle wheels each being coupled to a wheel brake cylinder.

4. The braking system as recited in claim 2, wherein the first brake circuit and the second brake circuit each include at least two vehicle wheels which are each assigned to different vehicle axles of the vehicle, the at least two vehicle wheels each being coupled to a wheel brake cylinder.

5. The braking system as recited in claim 2, wherein, with respect to at least one of the first brake circuit and the second brake circuit, the pressure regulating valve is configured to be selectively completely opened and the switchover valve is configured to be selectively opened in accordance with a differential pressure signal, and the hydraulic pump generates a fluid pressure in the hydraulic fluid, whereby a braking torque for vehicle wheels is provided at the wheel brake cylinders.

6. The braking system as recited in claim 2, wherein the brake input element is coupled to a sensor detecting an actuation of the brake input element by the driver with respect to an intensity of the actuation and a duration of the actuation of the brake input element.

7. The braking system as recited in claim 2, wherein the hydraulic pump is used for selectively building up an elevated hydraulic fluid pressure in the first brake circuit.

* * * * *